United States Patent
Stein (10) Patent No.: US 7,267,001 B1
(45) Date of Patent: Sep. 11, 2007

(54) APPARATUS FOR SECURELY MOUNTING AND CONTINUOUSLY MONITORING THE WEIGHT OF A LIQUIFIED GAS TANK

(76) Inventor: Daniel J. Stein, 13292 Benchley Rd., San Diego, CA (US) 92130

( * ) Notice: Subject to any disclaimer, the term of this patent is extended or adjusted under 35 U.S.C. 154(b) by 0 days.

(21) Appl. No.: 11/419,723

(22) Filed: May 22, 2006

(51) Int. Cl.
*G01F 23/20* (2006.01)
*G01G 19/08* (2006.01)

(52) U.S. Cl. .................. 73/296; 177/136; 177/245; 177/DIG. 9

(58) Field of Classification Search ............. 73/296; 177/136, 245, DIG. 9
See application file for complete search history.

(56) References Cited

U.S. PATENT DOCUMENTS

| | | | | |
|---|---|---|---|---|
| 2,330,857 A | * | 10/1943 | Alcott | 177/45 |
| 4,413,515 A | * | 11/1983 | Quinn | 73/296 |
| 5,600,104 A | * | 2/1997 | McCauley et al. | 177/136 |
| 5,850,757 A | * | 12/1998 | Wierenga | 73/296 |
| 6,148,668 A | * | 11/2000 | Sieg | 73/296 |
| 6,555,765 B2 | * | 4/2003 | Paine | 177/142 |
| 2005/0166673 A1 | * | 8/2005 | Kimbara et al. | |

* cited by examiner

*Primary Examiner*—Randy W. Gibson
(74) *Attorney, Agent, or Firm*—Thomas J. Tighe, Esq.

(57) ABSTRACT

A bottle plate mates or is integrated with brackets for mounting a gas bottle atop the plate. An aft end of the bottle plate is spacedly affixed to a top of a base plate, the bottle plate being bendable about its aft end corresponding to the weight of a bottle mounted thereon. A plurality of guide pins disposed at a fore end of the bottle plate prevents lateral movement of the fore end with respect to the base plate, but allows to a limited extent displacement of the fore end due to bottle weight. Any displacement of the fore end due to bottle weight is converted to a corresponding bottle weight and a display indicates same to a user. The base plate is used to securely mount the apparatus.

20 Claims, 6 Drawing Sheets

APPARATUS FOR SECURELY MOUNTING AND CONTINUOUSLY MONITORING THE WEIGHT OF A LIQUIFIED GAS TANK

BACKGROUND OF THE INVENTION

This invention relates to an apparatus for securely mounting a tank of compressed liquified gas in a vehicle and for continuously sensing and indicating the amount of liquified gas remaining in the tank.

While this invention is applicable in general to uses in which it is desirable to securely mount and continuously monitor the amount of a compressed liquified gas remaining in a tank, it is especially advantageous when used for mounting liquified nitrous oxide bottle tanks in racing vehicles. For example, bottle tanks containing liquified nitrous oxide are often securely mounted in the trunks of drag racing vehicles for piping the nitrous oxide to the vehicle's engine intake to boost horsepower and acceleration of the vehicle. In such cases, the nitrous oxide is stored under high pressure, typically around 900-1100 pounds per square inch (psi) for optimal performance, but as the gas in a bottle is used, the pressure can drop drastically and suddenly without warning. It is not uncommon for the pressure in a nitrous oxide bottle to suddenly drop to 600 psi or less when the bottle is running low (e.g., 1-2 lbs of gas remaining in a 10 lb. bottle), and at that point the nitrous oxide is no longer adding horsepower because the pressure of the remaining gas is below a typical threshold needed by a racing vehicle's intake system and the boost from the nitrous oxide starts cutting out.

Since the bottles must be very securely bolted into such racing vehicles, and since the only way of determining the amount of nitrous oxide remaining in a tank is to weigh it, drag racers especially are faced with a problem. Either they frequently unbolt their tanks and weigh them, which tends to be very time consuming, or they conservatively swap out nitrous oxide bottles before they are even half empty, typically after only five or six uses, based on estimating or guessing the amount of nitrous oxide remaining in a tank. Heretofore racers had no way of precisely knowing the amount of nitrous oxide remaining without removing the bottle and weighing it.

This invention takes the guesswork out of swapping tanks and eliminates the need to remove a bottle to weigh it; a racer can know precisely at any time the amount of liquified nitrous oxide remaining in a bottle without unbolting the tank and weighing it. This means that racers can reliably make more runs before swapping out bottles, which is a significant saving in time and money. Moreover, the advantages apply as well to racing boats that use nitrous oxide to boost horsepower and acceleration, and basically any vehicle in which a nitrous oxide bottle must be securely mounted.

Other advantages and attributes of this invention will be readily discernable upon a reading of the text hereinafter.

SUMMARY OF THE INVENTION

An object of this invention is to provide an apparatus for securely mounting and continuously monitoring the weight of a compressed liquified gas tank.

A further object of this invention is to provide an apparatus for securely mounting and continuously monitoring the weight of a nitrous oxide bottle tank within a vehicle.

A further object of this invention is to provide an apparatus for securely mounting and continuously monitoring the weight of a nitrous oxide bottle within a racing vehicle.

A further object of this invention is to provide an apparatus for securely mounting and continuously monitoring the weight of a nitrous oxide bottle within a racing vehicle's trunk.

These objects, and other objects expressed or implied in this document, are accomplished by an apparatus for mounting and continuously monitoring the weight of a liquified gas bottle including: a first plate; a bottle mount for affixing a bottle atop the first plate; a base plate, an aft end of the first plate being spacedly affixed to a top of the base plate, the first plate being bendable about its affixed aft end corresponding to the weight of a bottle mounted thereon; a plurality of guide pins disposed at a fore end of the first plate for preventing lateral movement of the fore end with respect to the base plate, but allowing to a limited extent displacement of the fore end due to bottle weight; and a device for converting any displacement of the fore end due to bottle weight to a corresponding bottle weight. Preferably the apparatus includes a display for indicating to a user the bottle weight.

DESCRIPTION OF THE PREFERRED EMBODIMENT

Referring to FIGS. 1-3 and 5, a bottle type compressed gas tank 2 is mounted atop a plate 4 by means of fore and aft mounting brackets, 8 and 6 respectively. As used herein, the terms "fore" and "aft" refer to the end of the invention at which a gas valve 10 of a mounted tank or bottle is located and the opposite end, respectively. Each of the brackets has a squared U-shape frame bolted to the plate, and supported by the upright legs of each bracket frame is a circular clamp, 12 and 14, for securing the bottle to the brackets. As illustrated the fore bracket 8 supports the bottle 2 higher than bracket 6 causing the bottle to be forwardly inclined to keep the liquified gas at the bottom of the bottle where the outlet valve intake is located. Beneath the plate 4 upon which the bottle is mounted, i.e. the bottle plate, is a base plate 16. The base plate is preferably the mechanical mounting interface between the apparatus of this invention as described herein and a vehicle in which or on which the structure is to be mounted. The aft end of the bottle plate is spacedly affixed atop an aft end of the base plate by means of bolts 18 and spacers 20. Extending through holes defined by the bottle plate 4 at its fore end are two guide pins illustrated herein as bolts 22 with heads spaced above the bottle plate, and with threaded ends extending through holes defined by the base plate 16. Sleeving each bolt 22 is a resilient, rubber or rubber-like sleeve 24 extending between the bolt's head and the bottle plate, and on each bolt is an axially concentric light coiled spring 26 disposed between the bottle plate and the base plate. Each bolt 22 is secured in relation to the base plate preferably by an engaging 23 nut beneath the base plate. The guide pins 22 restrict lateral movement of the bottle plate with respect to the base plate, but allow limited vertical movement of the fore end of the bottle plate with respect to the base plate. This allows the fore end of the bottle plate to flex toward and away from the base plate depending on the weight of the liquified gas in the bottle 2. Adjacent to the corner of the bottle plate that is closest to the pivot pin 42, a rubber or rubberlike bumper pad 27 is disposed between the bottle and base plates, spaced from the former and affixed to the latter. The pad acts to dampen extreme downward swings of the bottle plate 4 that can occur when the surface over which the vehicle is traveling is rough.

In use on a vehicle, the base plate 16 is securely affixed to the vehicle, for example by strong bolts. In the case of a racing vehicle the base plate is typically affixed to a trunk floor of the vehicle. The bottle is strongly secured to the base plate by the arrangement described above to withstand the various forces applied to it by acceleration, deceleration, and turning of the vehicle, and even though the bottle is securely in place, the bottle plate can nevertheless flex about a lateral axis defined by the aft bolts 18, depending on the weight of the bottle which varies according to the amount of liquified gas contained therein.

Figure 8:
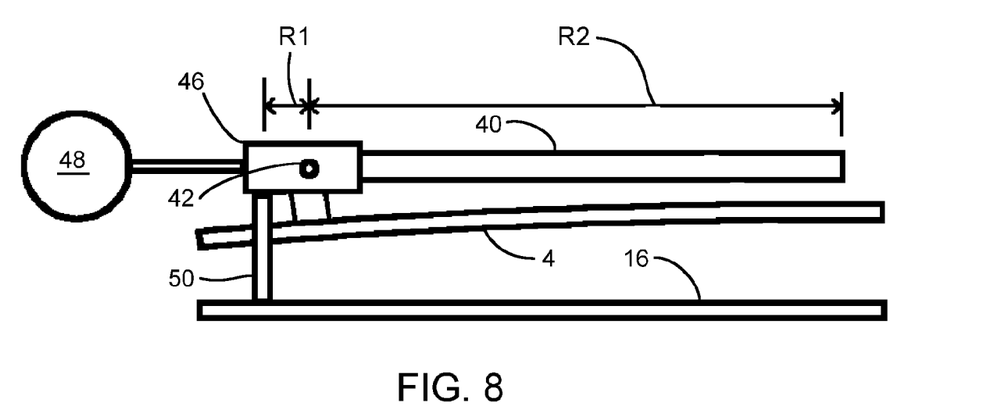

Referring to FIGS. 1, 2, 4, 7 and 8, a device for converting the flexing of the bottle plate 4 to a corresponding indication of the amount of gas remaining in the bottle is illustrated. Spaced vertically above the base plate 16 by means of a bracket 32 is a potentiometer 34 having a pivoting wiper arm lever 36 connected to a cam 37 (illustrated as the shank of a screw connected to the lever 36) that is slidable in an axial slot 38 defined by an aft end of an elongated arm 40. In this embodiment the potentiometer 34 is adjacent an upright leg of the bracket 6. At its fore end the arm 40 is connected to a pivot pin 42 that is spaced above the bottle plate by a bracket 44. Since the pivot pin is near the fore end of the bottle plate, it moves up and down corresponding to flexing of the bottle plate. A fore-wise extension 46 of the arm 40 extends beyond the arm's pivot axis. A counterweight 48 affixed to the arm's extension by a rod 49 biases the arm to pivot the arm's aft end upward (away from the base plate). Offset fore-wise from the arm's pivot axis is a vertical post 50 extending from the base plate. The head of the post 50 abuts the arm's extension 46 and, in operation, as the fore end of the bottle plate moves downward (toward the base plate) due to the bottle plate 4 bending in response to bottle weight (as best shown in FIG. 8), the arm's extension 46 will react against the fixed post 50 causing the fore end of the arm 40 to pivot upward against the bias of the counterweight 48 and consequently causing the aft end of the arm to pivot downward. The greater the downward bend of the bottle plate, the greater the downward pivoting of the aft end of the arm, and correspondingly the lever 36 of the potentiometer will also pivot downward due to the cam 37 being confined in slot 38 of the arm. In response to the downward pivoting of the lever 36, the potentiometer will produce a corresponding signal that drives a display or gauge that is preferably graduated and calibrated to indicate the weight of gas remaining in the bottle. In the preferred embodiment the gauge is an adapted automobile gasoline gauge.

Figure 9:
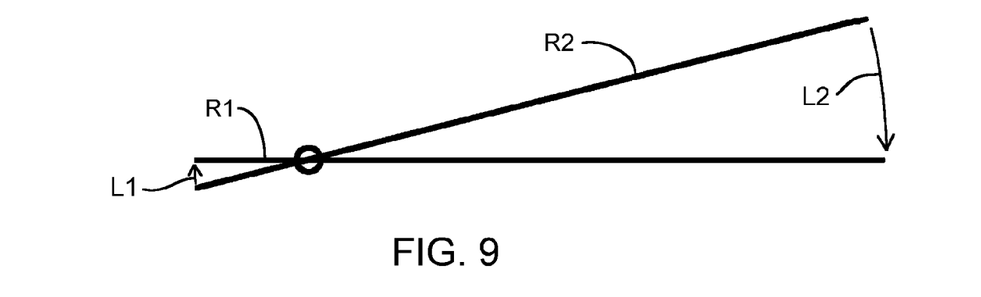

In the preferred embodiment, the maximum flex displacement (bottle full) of the fore end of the bottle plate is only about 0.075 inches whereas the operational pivot range of wiper arm lever 36 is about 1.65 inches, much greater. The arm 40 serves to linearly amplify the flex displacement of the bottle plate fore end to a scale compatible with the wiper arm of the potentiometer. As illustrated in FIGS. 8 and 9, the length L2 of the downward swing of the arm's aft end is essentially equal to the upward swing L1 of the arm's fore end multiplied by the ratio of R2 to R1.

It should be understood that the device for converting the flexing of the bottle plate to corresponding indications of the amount of liquified gas remaining in the bottle can be implemented differently than as described above. For example, strain gauges can be used to provide a signal corresponding to the flexure of the bottle plate in response to the changing weight of the gas in the bottle.

Figure 1:
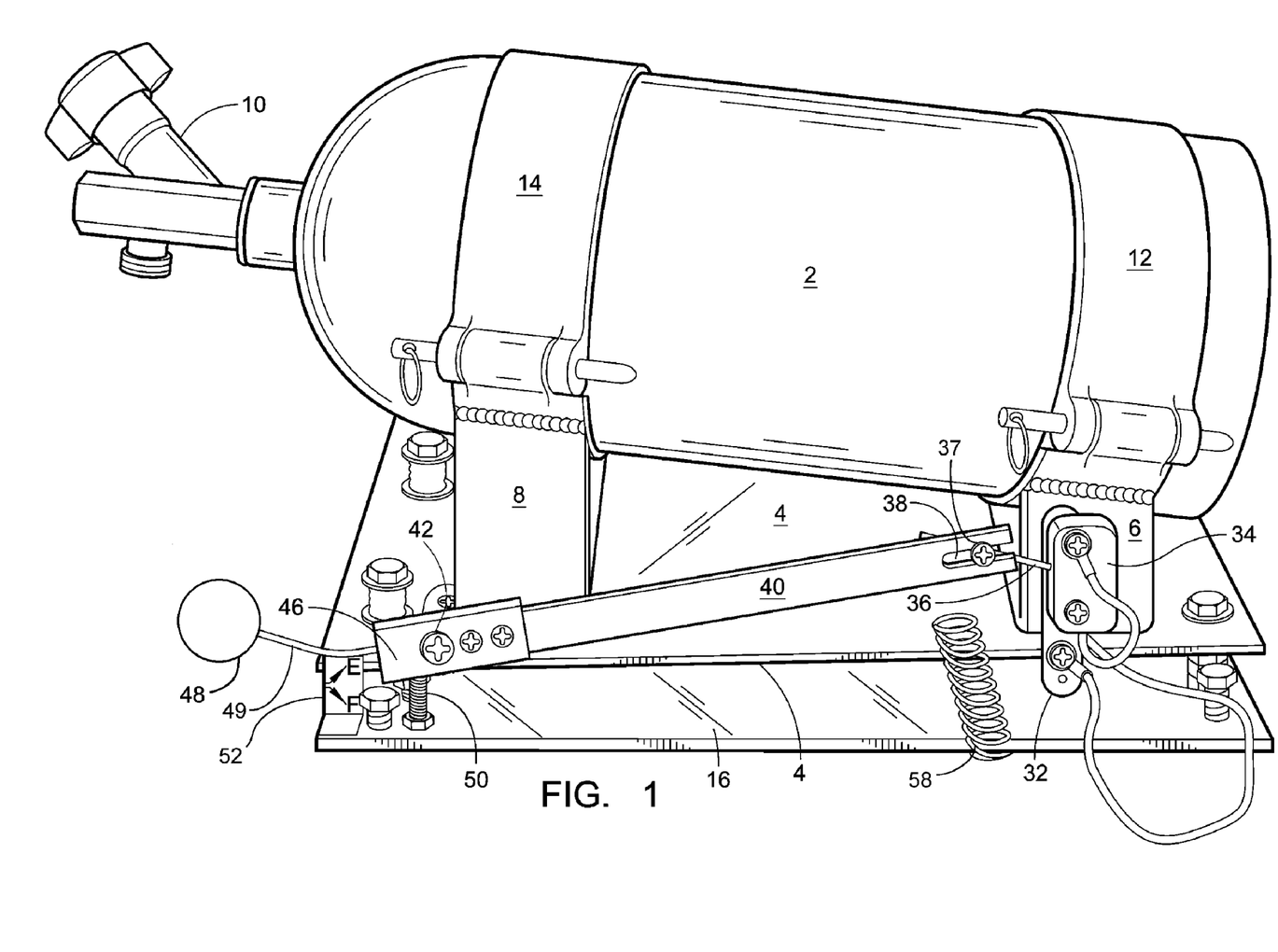
FIG. 1 is a side pictorial view of a liquified gas bottle mounted atop a preferred embodiment of this invention.
Figure 5:
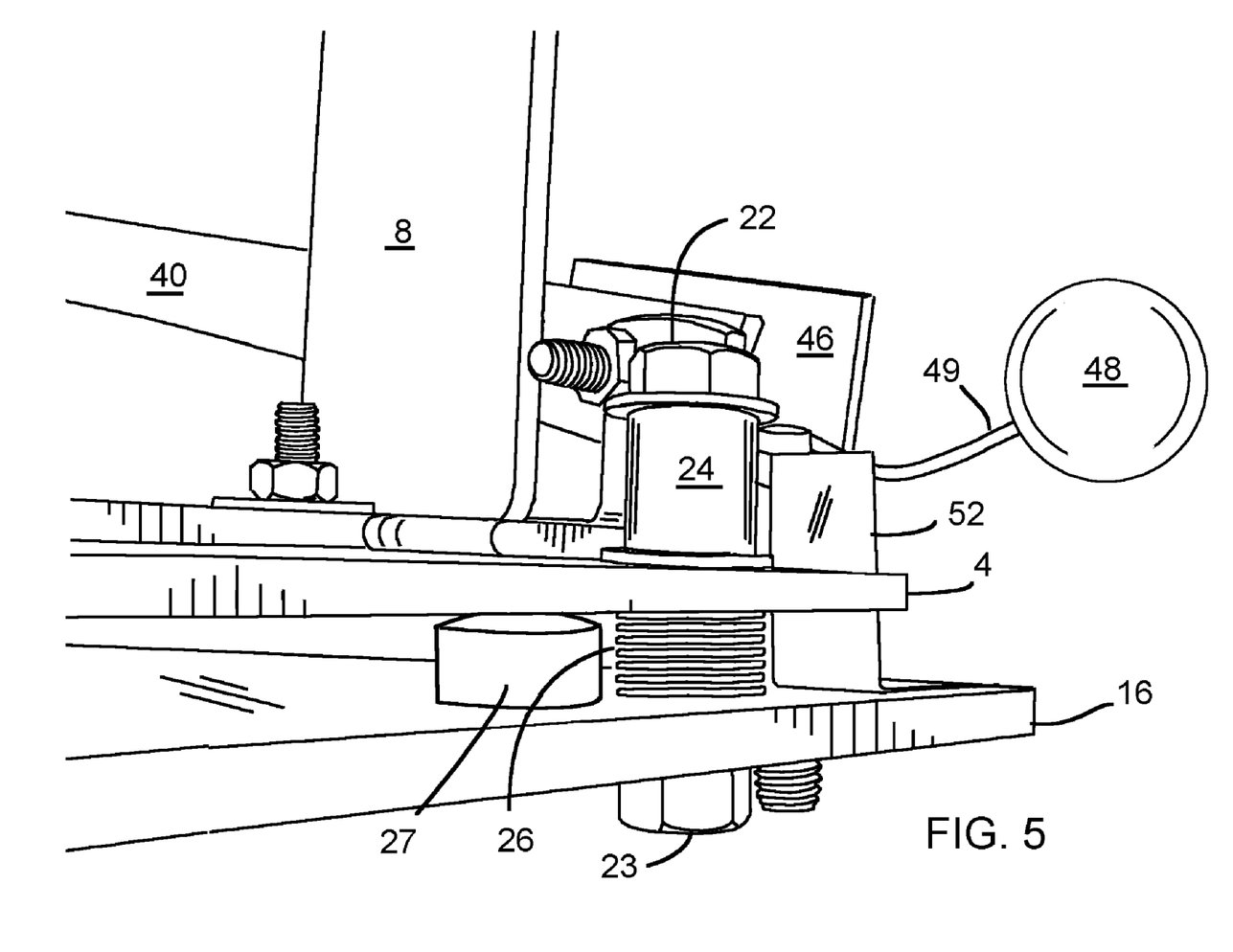
FIG. 5 is a partial perspective view of a corner of this invention.

Referring to FIGS. 1 and 5, the apparatus can also include a tab 52 adjacent a side of the fore end of the bottle plate 4 with indicia, e.g., vertically spaced "E" and "F" facing outward to indicate whether the bottle is empty or full, respectively, or somewhere in between. As illustrated the "E" is at the same vertical height from the base plate as the bottle plate would be if it were empty, and the "F" is at the same vertical height from the base plate as the bottle plate would be if it were full.

Figure 2:
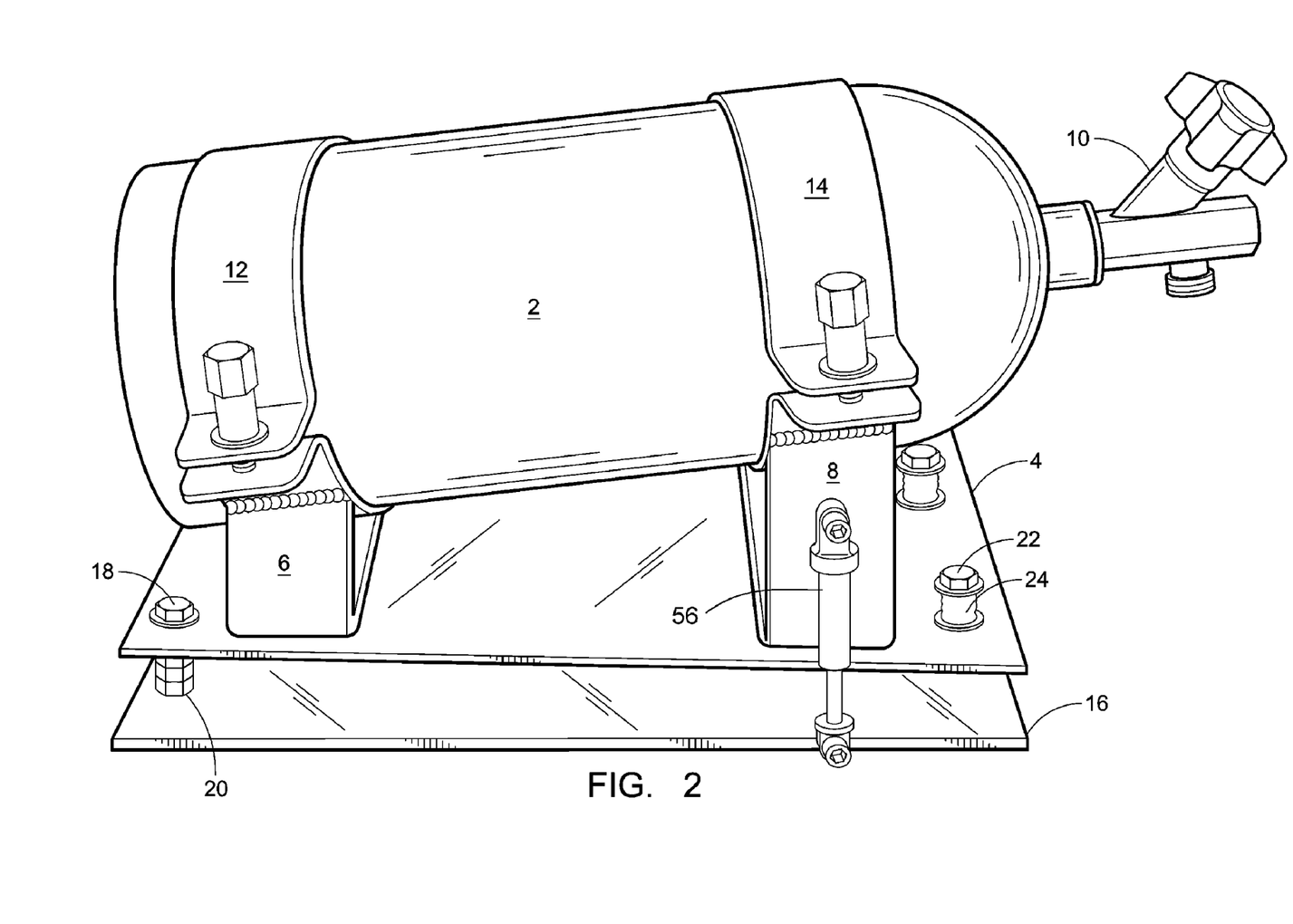
FIG. 2 is an opposite side pictorial view of the bottle mounted atop a preferred embodiment of this invention.
Figure 3:
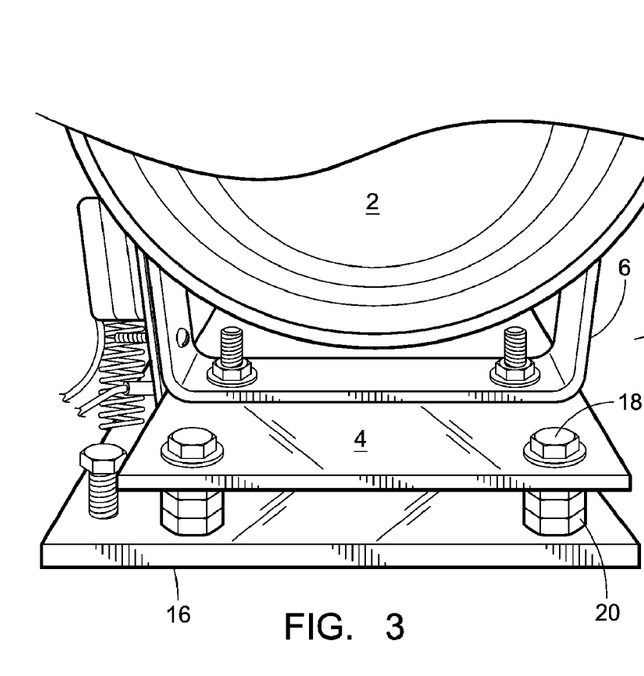
FIG. 3 is a partial pictorial view of a rear end of the bottle and mounting.
Figure 4:
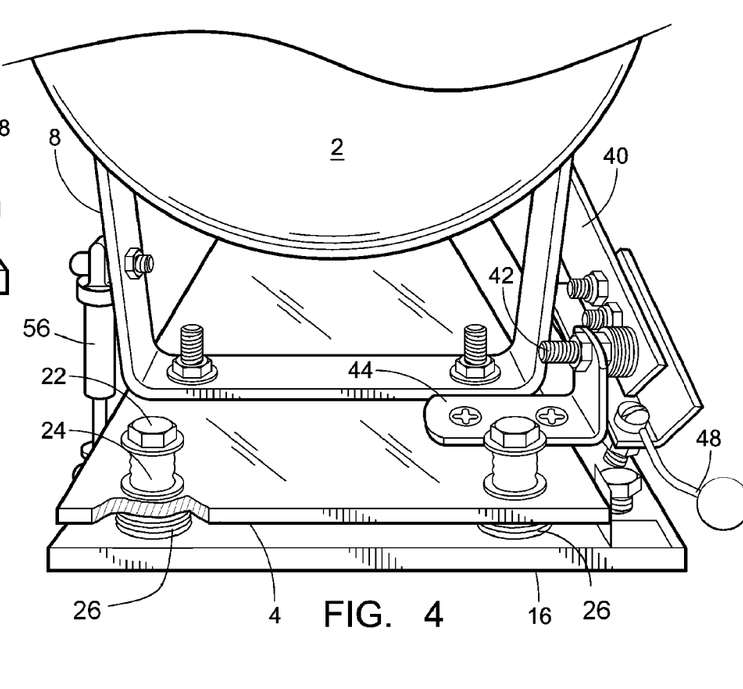
FIG. 4 is a partial pictorial view of front end of the bottle and mounting.

Referring to FIGS. 2 and 4, the preferred embodiment further includes a shock absorber 56 to dampen and inhibit transient flexing of the bottle plate with respect to the base plate due to transient vertical acceleration of a vehicle incorporating the apparatus, for example, transients caused by bumps, pot holes and such that a vehicle may encounter.

Figure 6:
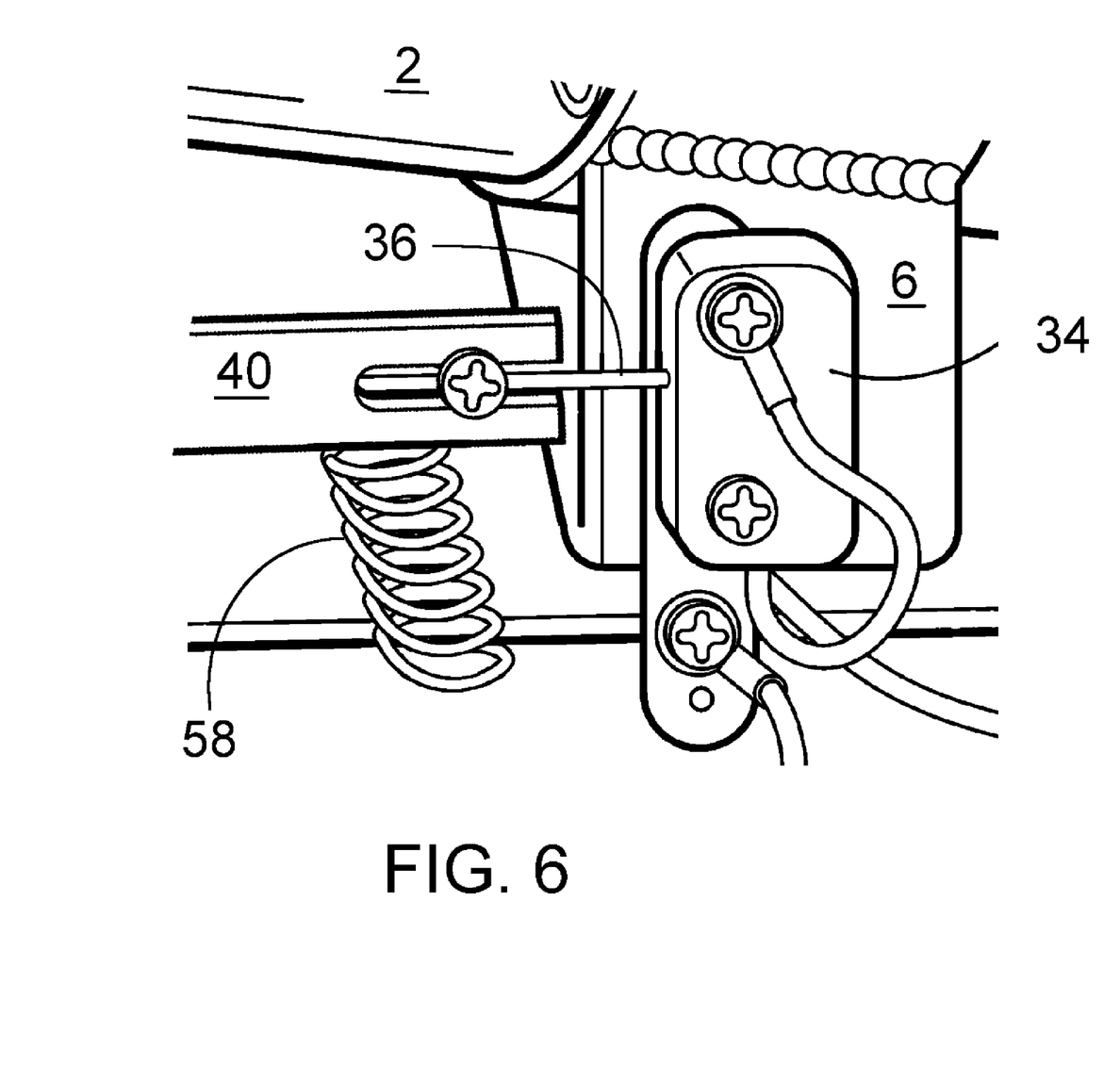
FIG. 6 is a partial perspective view further illustrating the operation of the preferred embodiment, particularly showing a tank full or near full.
Figure 7:
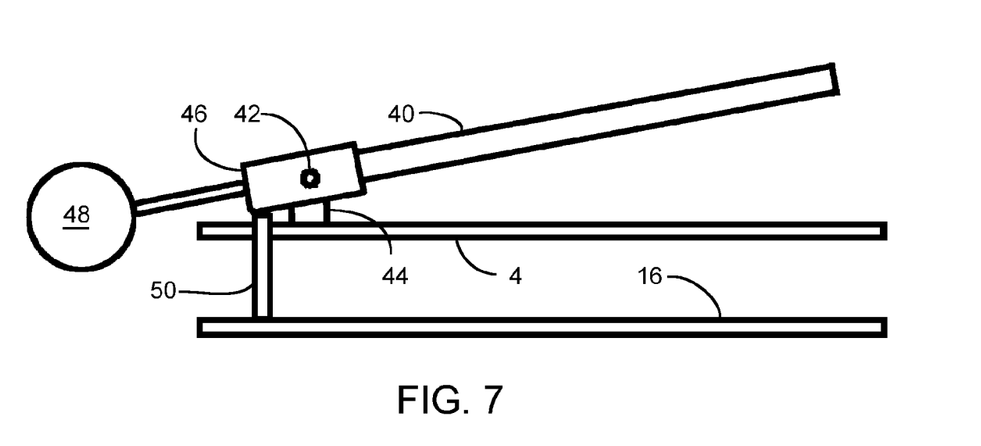
FIGS. 7-9 are diagrammatical illustrations regarding the operation of the apparatus.

Referring to FIGS. 1 and 6, the preferred embodiment further includes a compression spring 58 affixed to the base plate 16 below the aft end of arm 40. This spring further biases the arm's aft end to pivot upward, away from the base plate, and in effect aids the bias applied by the counterweight 48 whenever the tank is full or near full. This spring helps overcome any resistance due to linkage sticking between the arm and the cam 37, and any resistance of the potentiometer wiper arm 36.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. An apparatus for mounting in a vehicle and continuously monitoring the weight of a liquified gas contained in a tank comprising:
   a first plate;
   a mount for affixing the tank atop the first plate;
   a base plate being affixable to the vehicle, an aft end of the first plate being spacedly affixed to a top of the base plate, the first plate being bendable about its affixed aft end toward the base plate corresponding to the weight of the tank and its contents;

a guide disposed at a fore end of the first plate for preventing lateral movement of the fore end with respect to the base plate, but allowing gravity induced bending of the fore end toward and away from the base plate; and a device for converting any bend of the first plate's fore end due to gravity to a corresponding indication readable by a user.

2. The apparatus according to claim 1 wherein the indication is an indication of the weight of the contents of the tank.

3. The apparatus according to claim 1 wherein the device for converting comprises:

a device, including a movable lever, for producing signals corresponding to angular disposition of the lever within the lever's operational range;

a device for amplifying displacement of the fore end of the first plate due to gravity to a scale compatible to the operational range of lever;

a link responsive to the device for amplifying displacement of the fore end and operative to cause corresponding movement of the lever; and a display for converting the signals to corresponding indications of weight.

4. The apparatus according to claim 3 wherein the device for amplifying comprises:

an elongated arm pivotable about an axis, the arm having relatively long and short segments on opposite sides of the axis; and a mechanism for angularly displacing the arm's short segment corresponding to bending displacement of the first plate's fore end, the resulting angular displacement of the long segment being communicated to the link.

5. The apparatus according to claim 4 wherein the axis is spaced above the first plate proximate a fore end of the first plate, and further comprising a post extending from the base plate that abuts the short segment of the elongated arm to cause it to angularly displace according to the bend of the first plate.

6. The apparatus according to claim 4 further comprising a bias applied to the short segment of elongated arm acting against angular displacement of the short segment due to bending of the first plate.

7. The apparatus according to claim 4 further comprising:

a potentiometer including a wiper arm connected to a cam slidably confined in a slot defined by the aft end of the long segment of the elongated arm, sliding of the cam as the long segment is angularly displaced causing the wiper arm to be correspondingly displaced, the potentiometer producing a signal corresponding to angular displacement of the wiper arm; and a visual indicator responsive to the signal for indicating corresponding weight of the contents of the tank.

8. The apparatus according to claim 7 further comprising a bias applied against an aft end of the long segment acting against angular displacement due to bending of the first plate, the bias being applied at least whenever the tank is full to help overcome any frictional resistance that may occur in the potentiometer or between the long segment and the wiper.

9. The apparatus according to claim 1 further comprising a bumper between the fore end of the first plate and the base plate for damping excessive bending of the first plate due to vertical jarring of the vehicle.

10. The apparatus according to claim 1 further comprising plurality of guide pins disposed at a fore end of the first plate for preventing lateral movement of the fore end with respect to the base plate, but allowing gravity induced bending of the fore end toward and away from the base plate.

11. An apparatus for mounting in a vehicle and continuously monitoring the weight of a liquified gas contained in a bottle tank comprising:

a first plate;

a mount for affixing the bottle tank atop the first plate;

a base plate being affixable to the vehicle, an aft end of the first plate being spacedly affixed to a top of the base plate, the first plate being bendable about its affixed aft end toward the base plate corresponding to the weight of the bottle tank and its contents;

a guide disposed at a fore end of the first plate for preventing lateral movement of the fore end with respect to the base plate, but allowing gravity induced bending of the fore end toward and away from the base plate; and a device for converting any bend of the first plate's fore end due to gravity to a corresponding indication readable by a user.

12. The apparatus according to claim 11 wherein the indication is an indication of the weight of the contents of the tank.

13. The apparatus according to claim 11 wherein the device for converting comprises:

a device, including a movable lever, for producing signals corresponding to degrees of movement of the lever within the lever's operational range;

a device for amplifying displacement of the fore end of the first plate due to gravity to a scale compatible to the operational range of lever;

a link responsive to the device for amplifying displacement of the fore end and operative to cause corresponding movement of the lever; and a display for converting the signals to corresponding indications of weight.

14. The apparatus according to claim 13 wherein the device for amplifying comprises:

an elongated arm pivotable about an axis, the arm having relatively long and short segments on opposite sides of the axis; and a mechanism for angularly displacing the arm's short segment corresponding to bending displacement of the first plate's fore end, the resulting angular displacement of the long segment being communicated to the link.

15. The apparatus according to claim 14 wherein the axis is spaced above the first plate proximate a fore end of the first plate, and further comprising a post extending from the base plate that abuts the short segment of the elongated arm to cause it to angularly displace according to the bend of the first plate.

16. The apparatus according to claim 14 further comprising a bias applied to the short segment of elongated arm acting against angular displacement of the short segment due to bending of the first plate.

17. The apparatus according to claim 14 further comprising:
a potentiometer including a wiper arm connected to a cam slidably confined in a slot defined by the aft end of the long segment of the elongated arm, sliding of the cam as the long segment is angularly displaced causing the wiper arm to be correspondingly displaced, the potentiometer producing a signal corresponding to angular displacement of the wiper arm; and
a visual indicator responsive to the signal for indicating corresponding weight of the contents of the tank.

18. The apparatus according to claim 17 further comprising a bias applied against an aft end of the long segment acting against angular displacement due to bending of the first plate, the bias being applied at least whenever the tank is full to help overcome any frictional resistance that may occur in the potentiometer or between the long segment and the wiper.

19. The apparatus according to claim 11 further comprising a bumper between the fore end of the first plate and the base plate for damping excessive bending of the first plate due to vertical jarring of the vehicle.

20. The apparatus according to claim 11 further comprising plurality of guide pins disposed at a fore end of the first plate for preventing lateral movement of the fore end with respect to the base plate, but allowing gravity induced bending of the fore end toward and away from the base plate.

* * * * *